Feb. 4, 1969     J. S. HOLLOWELL     3,425,646
RETRACTION DEVICE FOR VEHICLE SAFETY BELTS
Filed April 1, 1963     Sheet 2 of 2
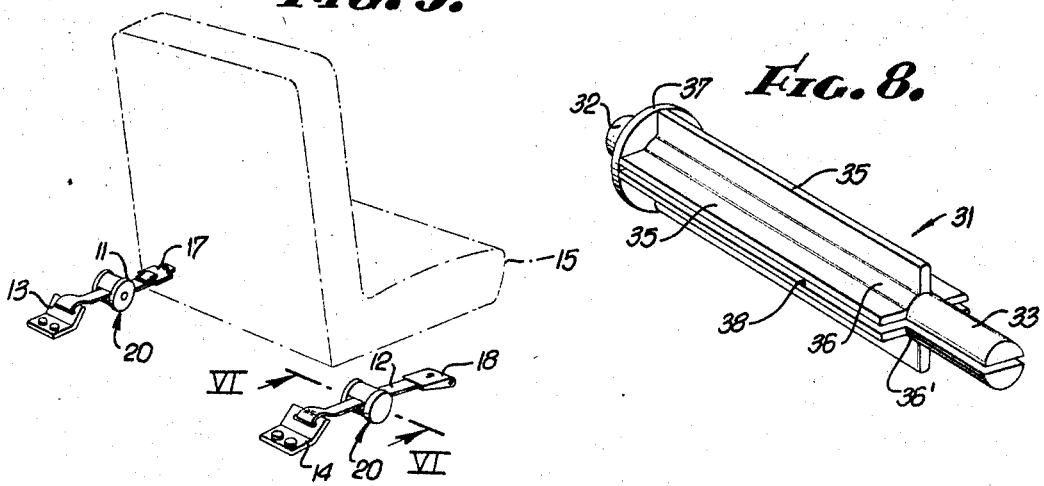
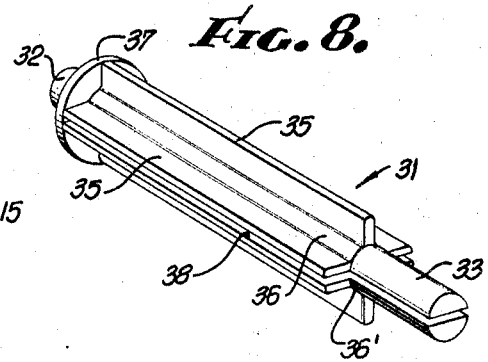
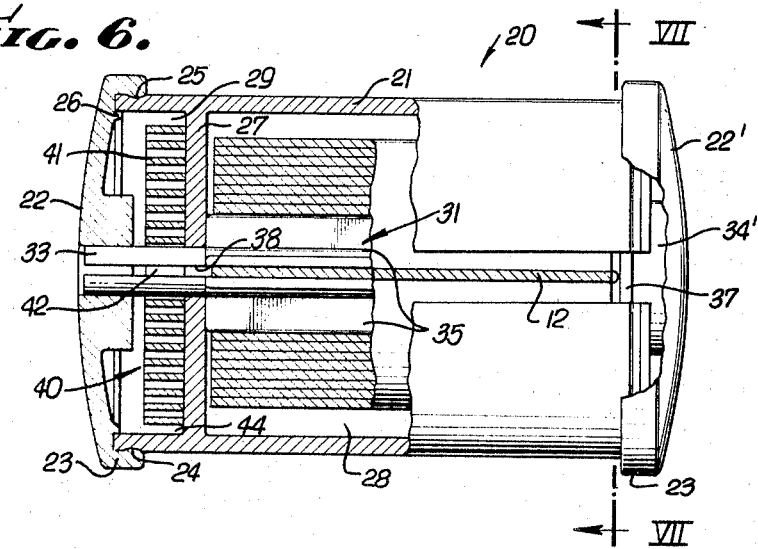
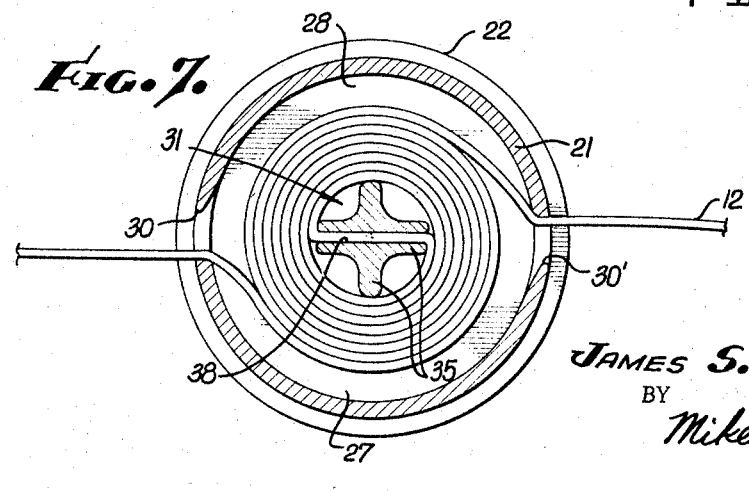
INVENTOR.
JAMES S. HOLLOWELL
BY
Miketta and Glenny
ATTORNEYS.

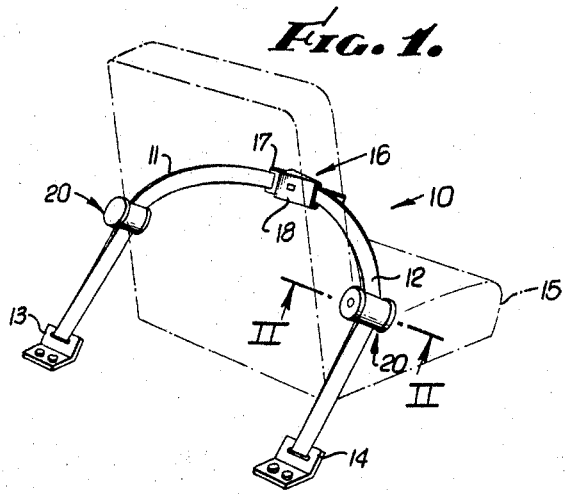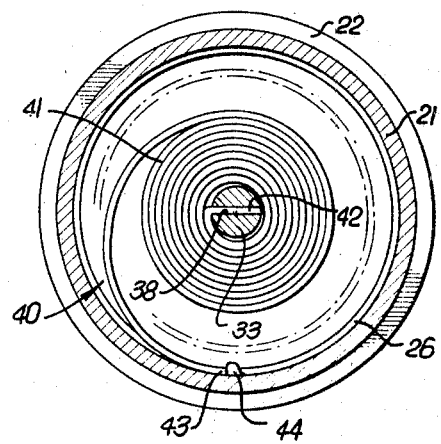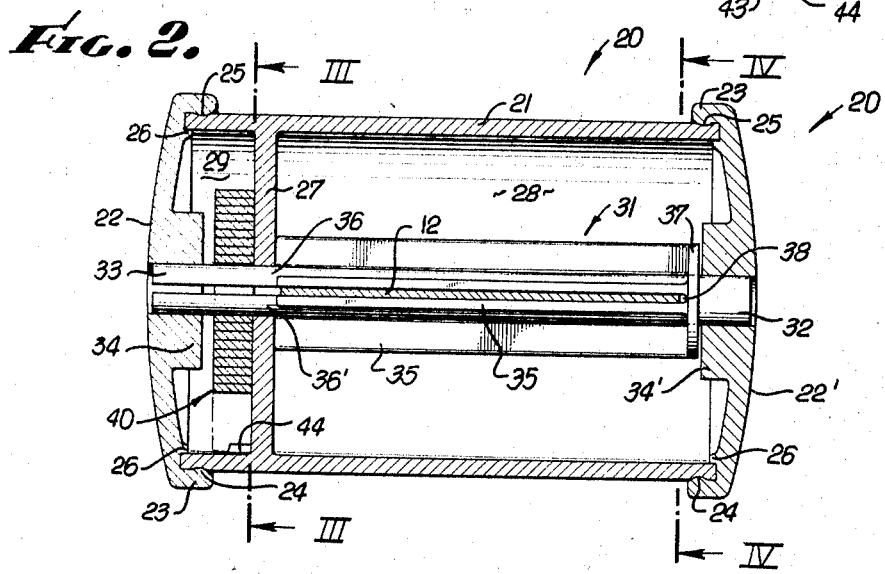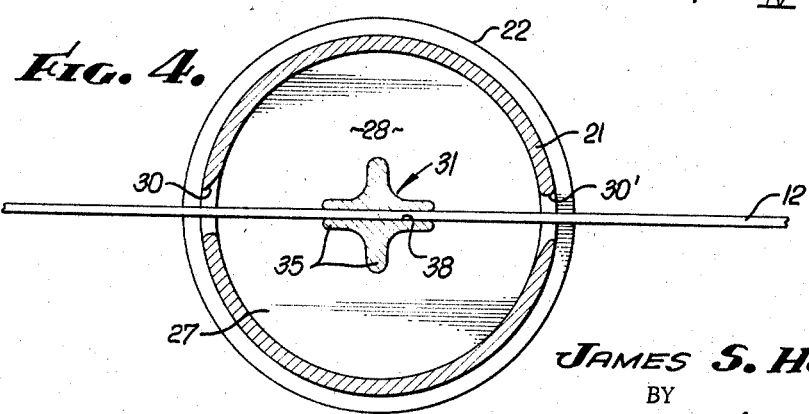

United States Patent Office 3,425,646
Patented Feb. 4, 1969

3,425,646
RETRACTION DEVICE FOR VEHICLE SAFETY BELTS
James Sherman Hollowell, Arcadia, Calif., assignor, by mesne assignments, to American Safety Equipment Corp. of California, a corporation of California
Filed Apr. 1, 1963, Ser. No. 269,657
U.S. Cl. 242—107.11                              6 Claims
Int. Cl. B65h 75/48; B60r 21/10; A62b 35/00

This invention, in general, relates to safety belts for vehicles and retraction means to be employed with the straps of such belts. More particularly, this invention relates to a retraction device easily assembled to and suspended on an intermediate portion of a safety belt strap to retract the strap whenever the safety belt is unlatched.

The use of safety belts in vehicles such as automobiles and airplanes has become an accepted safety feature of modern day travel. The mandatory use of safety belts in automobiles, in addition to airplanes, will become the law in most states in the near future. Together with this, an increased public awareness of the value of safety belts as a preventive against serious injury has greatly increased the present day use of safety belts. One objectionable feature in the use of safety belts in both airplane and automobiles is their random and sometimes entangled array when not in use. Also, where more than one belt is installed in a bench type auto seat, or on adjacent bucket type seats used in sports cars and airplanes, the passenger may be confused initially as to which strap goes to which belt. In any installation, keeping the belt straps neatly arranged, clean and the loose ends entirely within the vehicle is a time-consuming, burdensome and sometimes irritating task.

Retraction devices for safety belts have been employed previously wherein a reel is mounted on the floor of the vehicle and the safety belt straps reel out of the device for use, as a fish line comes off a fisherman's reel. While such devices retract the straps of the safety belt when not in use, they are objectionable because the reel is interposed between the strap and floor fitting associated with the vehicle floor and/or frame. Present day requirements for approval of safety belts by state and federal agencies specify load carrying capacities for safety belts of from three to five thousand pounds. The floor fitting must be able to withstand loop loads on the belt of from three to five and, in some manufacturer's requirements, six thousand pounds. Obviously, a floor mounted reel for the safety belt straps in such cases must withstand similar loads and be heavily constructed to withstand them. Such construction makes these devices both cumbersome and expensive for use in quantity in automobiles and/or airplanes.

It is therefore the principal object of my invention to disclose and provide a retraction device for use with a safety belt strap to effectively retract the strap within the device when the belt is not in use and which is not in a load carrying relationship to the strap when the safety belt is in use and under load.

It is another object of my invention to disclose and provide a safety belt strap retraction device for automatically retracting the strap within the device when the belt is not in use to keep the strap and attached tongue plate or buckle located out of the way of passengers getting into or leaving the vehicle, as well as keeping the strap neat and clean.

It is also an object of the present invention to disclose and provide a novel retraction device for use at a point intermediate the strap ends on each strap of a safely belt, without interrupting the load carrying continuity of the strap, and which retracts both segments of the strap, lying on either side of the device, in generally equal amounts to return the attached tongue plate or buckle upon release of the safety belt buckle mechanism to an area near its associated floor fitting.

It is a further object of my invention to disclose and provide a safety belt strap retraction device for use with each strap of a safety belt to automatically retract such strap within the device when the belt is not in use, which device may be easily manufactured from inexpensive materials such as plastic and which is lightweight, readily assembled or disassembled and so simply constructed and operated that those not skilled in the art will readily understand how to assemble the device to the strap of a safety belt and operate it for use as a retraction device with such belt.

Various other objects, as well as numerous advantages for the retraction device for vehicle safety belts, in accordance with my invention, will become apparent to those skilled in the art upon a consideration of the following detailed description of an exemplary embodiment thereof. Reference will be made to the appended sheets of drawings in which:

FIG. 1 is a perspective view of a vehicle safety belt, shown installed about a vehicle seat shown in phantom lines, and an exemplary embodiment of the retraction device for vehicle safety belts, according to my invention, being shown employed with each of the straps in fully unwound position;

FIG. 2 is a sectional view on a much larger scale of one of the exemplary embodiments of the retraction device for vehicle safety belts shown in FIG. 1 and taken therein along the plane II—II;

FIG. 3 is a transverse section of the device of FIG. 2 taken therein along the plane III—III;

FIG. 4 is a sectional view of the device of FIG. 2 taken therein along the plane IV—IV;

FIG. 5 is a perspective view of an automobile safety belt in unlatched, strap retracted or fully wound position relative to a vehicle seat, shown in phantom lines, with each strap of the safety belt retracted within an exemplary embodiment of the retraction device of FIGS. 1 through 4;

FIG. 6 is a sectional view on a much larger scale of one of the exemplary embodiments of the retraction device of FIG. 5 taken therein along the plane VI—VI;

FIG. 7 is a sectional view of the device of FIG. 6 taken therein along the plane VII—VII, and FIG. 8 is a perspective view of the spindle employed in the exemplary embodiment of retraction device of FIGS. 1 through 7.

Referring first to FIG. 1, a vehicle safety belt, indicated generally at 10, is normally installed with a pair of flat straps or belt sections 11 and 12 extending from belt section anchor means as floor fittings 13 and 14 associated with the floor and/or frame of the vehicle, about a vehicle seat, shown in phantom at 15. The belt sections or straps 11 and 12 are releasably secured to each other by a buckle mechanism or separable coupling unit indicated generally at 16. In the embodiment of belt shown, a metal tongue plate 17 mounted on the end of strap 11, is releasably secured within the metal buckle 18, adjustably mounted on the end of strap 12. The buckle mechanism,, indicated generally at 16, can also be of the thread through or cam type, although the indicated metal-to-metal type of buckle is becoming generally preferred. However, the retraction device for vehicle safety belts, in accordance with my invention, may be used with the straps of any safety belt employed regardless of whether such belt employs a cam type or metal-to-metal type of buckle.

An exemplary embodiment of the retraction device, according to my invention, is indicated generally at 20 on each of the straps 11 and 12 of the safety belt in FIG. 1. As shown in FIG. 5, when the complementary parts of the buckle mechanism or separable coupling unit safety belt tongue 17 and buckle 18, are disengaged the straps 11 and 12 are retracted within or fully wound by the retraction device and returned to an area near the respective floor mountings 13 and 14. The installation shown in FIGS. 1 and 5 is that normally employed with a bucket type seat employed in sports cars and airplanes. In these installations it is preferred that the retraction device, indicated generally at 20, be installed at the approximate midpoint of the straps 11 and 12 arranged on opposite sides of the seat so that an equal amount of the strap portions lying on either side of the device will be retracted within the device. In an installation on a bench type seat in an automobile where the belt sections are arranged on the seat to receive a passenger therein-between, the inner or center straps of the normal two passenger seat belt installations must pass between the back rest of the seat and the seat itself. In such situations, the retraction device, indicated generally at 20, should be placed nearer to the buckle or tongue so that it will retract the strap until the device contacts the intersection of the back rest and seat. In each instance, however, the device is mounted on the strap intermediate its ends and does not carry any loading placed on the safety belt.

Referring now to FIGS. 2 and 6, it may be seen that the retraction device, indicated generally at 20, comprises a chambered housing or casing, preferably made of plastic having a continuous outer wall 21 of generally circular cross-section and a pair of end caps 22 and 22'. End caps 22 and 22' are also preferably made of plastic and are generally circular to fit about the open ends of tubular wall 21. Each end cap 22 and 22' is provided with a resilient annular lip 23 having a continuous inwardly directed bead 24 adapted to snap into a circumferential groove 25 in the outer surface of tubular outer wall 21. An inner abutment or raised ring 26 may be provided on the interior wall of each end cap 22 and 22' to engage interior marginal surfaces of the ends of the tubular outer wall 21. As can be seen in FIGS. 2 and 6, the ends of the tubular outer wall 21 may be held securely between the inner abutment or ring 26 and the raised bead 24 on the resilient lip 23. Since the end caps 22 and 22' may be fitted or snapped readily onto or removed from the tubular outer wall 21, the assembly and disassembly of the device is greatly facilitated. Tubular outer wall 21 is further provided with a ported wall or separator 27 forming a strap receiving chamber 28 between it and end cap 22' and a spring receiving chamber 29 between it and end cap 22. As best seen in FIGS. 4 and 7, the strap receiving chamber 28 of the chambered housing is provided with opposing strap receiving slots or apertures 30 and 30' to allow a strap to pass directly through the housing.

Means are provided for winding the strap into the retraction device through the strap receiving slot 30 and 30' into the strap receiving chamber 28. Such means in the exemplary embodiment comprises an elongated, arbor or spindle, indicated generally at 31, rotatably mounted within the housing. As shown in FIG. 8, the exemplary form of spindle means is provided with a rear end journal-bearing portion 32 and a longer front end journal-bearing portion 33. As shown in FIGS. 2 and 6, the forward end journal-bearing portion 33 is mounted in an embossed journal portion 34 in the end cap 22. Rear end journal-bearing portion 32 of the spindle is rotatably mounted in the embossed journal portion 34' in the end cap 22'. Centrally of the two end journal portions 32 and 33 of the spindle, there is provided an enlarged strap receiving portion. Such strap receiving portion in the exemplary embodiment comprises a plurality of wings 35 radiating from a pair of spaced opposed web portions 36 and 36'. Web portions 36 and 36' extend from an end disc 37 in spaced generally parallel relation to form a slot 38 through the central strap receiving portion of the spindle. Slot 38 extends from the rear end journal-bearing portion 32 and disk 37 through the forward end journal-bearing portion 33. The spindle or arbor thus formed by the two end bearing portions and central strap-receiving portion is longitudinally slotted over most of its length with the exception of the rear end bearing portion 32 and the disk 37. This exemplary embodiment of the spindle or reel means allows a very lightweight arbor or spindle construction which may be readily formed from plastic materials and which is particularly well suited for use in the retraction device as hereinafter explained.

When the straps of the belt, indicated generally at 10, are fully extended to allow the tongue 17 to engage the buckle 16, as shown in FIG. 1, the retraction device according to my invention is not in a load-carrying relationship to the strap 11 or 12 and therefore does not have to be capable of carrying any load whatsoever. As shown in FIGS. 1 and 4, rather than having the strap mounted from the retraction device as in the prior devices, the retraction device according to my invention is mounted and suspended or floated upon the strap itself in such a manner that it not only does not interfere with the load-carrying capabilities of the strap, but is readily assembled or disassembled from the strap. In the exemplary embodiment, particularly FIGS. 2 and 4, the slotted arbor or spindle receives the strap 12 directly through slot 38 formed between the upper and lower web portions 36 and 36' of the central strap receiving portion. The spindle, in turn, is rotatably mounted within the housing by its end journal-bearing portions 32 and 33 mounted in the embossed journal portions 34' and 34 of end caps 22' and 22 respectively. The entire retraction mechanism is thus merely suspended or floated on strap 12 when the straps are in the fully operable extended or working position of FIG. 1. The device may be assembled to the strap by merely passing the strap through the strap receiving slots 30 and 30' and directly through the slot 38 in arbor 31 or by removing the end cap 22', the spindle or arbor indicated at 31 and spring means, indicated generally at 40, and sliding the arbor onto an intermediate portion of the strap and reassembling the retractor. Naturally, strap receiving slots 30 and 30' must extend all the way through the end of the tubular outer wall 21 at the cap 22' to receive the strap. Once assembled to or suspended on the strap, the device may be moved readily and freely when in fully extended or unwound position along the strap to adjust its extent of retraction, its fullest retraction being normally available when it is positioned at the approximate midpoint of the strap.

Biasing means for biasing the spindle means into a strap wound position, shown in FIGS. 6 and 7, wherein the segments of the strap lying on either side of the device are wound within the housing, are provided. In the exemplary embodiment, such biasing means may comprise a spring means indicated generally at 40 in FIGS. 2, 3 and 6, mounted within the spring means receiving chamber 29. Such spring means may include a conventional form of flat coiled spring 41 having one end 42 slidably received within the slot 38, through the forward end journal-bearing portion 33 of the spindle, and a second end 43 abutting a stop 44 formed in the tubular wall 21. In FIGS. 2 and 3, such spring 41 is shown in its fully coiled position. In this position it is storing energy to bias the spindle or arbor, indicated generally at 31, to wind and thus retract the strap 12 upon release of the buckle mechanism indicated generally at 16.

Upon release of the buckle mechanism, indicated generally at 16, each strap 11 and 12 is wound within the housing of its associated retraction mechanism. The segments of the strap initially lying on either side of the device are wound within the housing in alternating spiral rings, as shown in FIGS. 6 and 7. The biasing means, indicated generally at 40, is then in a relaxed or uncoiled state.

From the foregoing description of an exemplary embodiment of the retraction device, according to my invention, it can be seen that the present retraction device may be employed at an intermediate portion of a safety belt strap in a non-load carrying relationship wherein belt loading is transmitted directly to the belt anchor means associated with the vehicle and the retractor is ready to retract the strap to a compact, out of the way position within the device. The device may be made of lightweight, relatively inexpensive materials, such as plastic, and can be readily assembled to and adjusted along the strap to effect a desired retraction of the strap.

Having thus described an exemplary embodiment of the retraction device according to my invention, I wish it understood that the foregoing detailed description was exemplary only and that the scope of my invention is limited by and defined in the following claims.

I claim:
1. A retraction device to be assembled to a safety belt intermediate the strap ends in a non-load carrying relationship to the strap for retracting such strap within the device upon the unlatching of the safety belt, said retraction device comprising:
   a chambered housing including a strap receiving chamber with opposed strap receiving slots and a spring receiving chamber, said chambers being separated by a ported partition;
   an elongated arbor rotatably mounted within said housing and passing through said ported partition; and
   a coil spring within said spring chamber having one end engaging said arbor and one end engaging said housing;
   said arbor having a longitudinal slot therethrough adapted to receive a safety belt strap passing directly through said housing between said opposed strap receiving slots.

2. A retraction device for use with a midportion of a safety belt strap leading to a tongue plate or buckle to retract said strap and plate or buckle when they are no in use, comprising:
   a housing, said housing having opposed apertures to receive a strap of a safety belt therethrough;
   a slotted arbor rotatably mounted within said housing adapted to receive the strap of a safety belt, extending through said housing between said apertures, within its slot without interrupting the continuity or configuration of the strap;
   and spring means within said housing having one end engaging said arbor and the other end engaging said housing for biasing said arbor into a strap retracted position wherein the segments of said strap on either side of the approximate midpoint of said strap are wound within said housing upon each other in a double spiral manner when the strap is not in use;
   said spring means yielding when said strap is extended for use until said strap passes directly through said housing and arbor in a generally flat plane.

3. A retraction device characterized by its use at the approximate midportion of a safety belt strap to retract both segments of said strap within said device at the same time to form a double wind of said strap when it is not in use, comprising:
   a housing means for retention of the strap when retracted, said housing means having opposed strap receiving slots in its outer walls thereof;
   spindle means for winding the two segments of said strap, a segment lying on either side of said housing, into said housing, said spindle means receiving said strap through an elongated slot passing directly through said spindle; and
   biasing means for biasing said spindle means into a strap wound position wherein both said segments are wound within said housing upon one another in alternating spiral rings.

4. A retraction device for use in combination with a strap of a vehicle safety belt, comprising:
   a chambered housing including a tubular casing having open ends and a ported partition wall, a pair of end caps having embossed, inwardly directed journals to receive an arbor and a pair of opposed strap receiving slots formed in said casing on one side of said partition wall;
   an arbor rotatably mounted in said housing through said ported partition wall having end bearings of reduced diameter to be received in said end cap journals and an elongated slot extending from one end bearing of said arbor longitudinally therethrough to adjacent the opposite end bearing;
   a safety belt strap passing through said opposed strap receiving slots and said elongated slot in said arbor, said slots being adapted to allow said strap to pass directly through said device when aligned; and
   spring means within said housing on another side of said partition wall associated with said elongated slot at said one end bearing to bias said arbor and strap into a fully wound, strap retracted position.

5. The retraction device of claim 4 wherein said arbor includes a strap receiving portion intermediate said end bearings, said strap receiving portion including a plurality of wings radiating from a pair of spaced opposed web portions forming said elongated slots.

6. The retraction device of claim 5 wherein said opposed strap receiving slots in said chambered housing extend from adjacent the end of said tubular casing through the opposite end of said casing, whereby said strap may be received endwise through said strap receiving slots.

References Cited

UNITED STATES PATENTS

| | | | |
|---|---|---|---|
| 1,313,644 | 8/1919 | Simon | 242—107 |
| 1,157,505 | 10/1915 | Cameron | 242—107 |
| 1,479,448 | 1/1924 | Bentley | 242—118 |
| 1,479,449 | 1/1924 | Bentley | 242—118 XR |

FOREIGN PATENTS

| | | |
|---|---|---|
| 105,983 | 11/1942 | Sweden. |
| 1,108,692 | 9/1955 | France. |

CASMIR A. NUNBERG, *Primary Examiner.*

U.S. Cl. X.R.
297—388